No. 735,015. PATENTED JULY 28, 1903.
A. DE DION & G. BOUTON.
MANUFACTURE OF ELECTRIC IGNITERS.
APPLICATION FILED SEPT. 10, 1902.
NO MODEL.
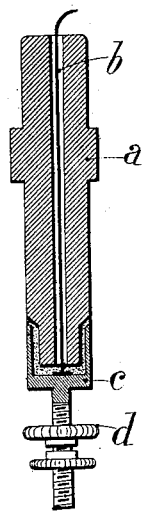
Witnesses:
Inventors
Albert De Dion
Georges Bouton
By James L. Norris.
Atty.

No. 735,015. Patented July 28, 1903.

UNITED STATES PATENT OFFICE.

ALBERT DE DION AND GEORGES BOUTON, OF PUTEAUX, FRANCE.

MANUFACTURE OF ELECTRIC IGNITERS.

SPECIFICATION forming part of Letters Patent No. 735,015, dated July 28, 1903.

Application filed September 10, 1902. Serial No. 122,862. (No model.)

*To all whom it may concern:*

Be it known that we, ALBERT DE DION, gentleman, and GEORGES BOUTON, engineer, citizens of the French Republic, residing at 36 Quai National, Puteaux, Seine, France, have invented certain new and useful Improvements in Electric Igniters, of which the following is a specification.

This invention relates to an electric igniter primarily intended for use in connection with internal-combustion engines.

The invention is shown in one simple adaptation thereof in the accompanying drawing in sectional elevation.

The letter $a$ denotes a core which is made of some suitable insulating material, it being longitudinally bored for the passage of the conductor $b$, which, it will be seen, passes freely through said bore. Upon the lower end of the core $a$ of insulating material is the bottom $c$, made in the form of a cap. This bottom $c$ is made of some conducting material and is soldered to the core by a suitable metallic solder. The core $a$ may consist of porcelain and the bottom $c$ of copper, and when such parts are made of these materials the solder may consist of an alloy comprising eighty-five per cent., in weight, of copper and fifteen per cent., in weight, of aluminium. The materials from which the core and bottom are made and the solder uniting the same need not be of the kinds set forth.

The lower end of the conductor $b$, it will be seen, is united to the bottom $c$ by the solder which unites said bottom to the core, so that the conductor is held against displacement by means which form a part of the conducting system.

Having described the invention, what is claimed as new, and desired to be secured by Letters Patent, is—

An electric igniter comprising a longitudinally-bored core of insulating material, a bottom of conducting material, a metallic solder uniting the parts, and a conductor passing freely through the bore of the core and united to the bottom by the solder which joins said bottom to the core.

In testimony whereof we have hereunto set our hands in presence of two subscribing witnesses.

ALBERT DE DION.
GEORGES BOUTON.

Witnesses:
EDWARD P. MACLEAN,
EMILE KLOTZ.